United States Patent [19]
Kitterman

[11] Patent Number: 5,634,292
[45] Date of Patent: Jun. 3, 1997

[54] APPARATUS AND METHOD FOR ATTRACTING AND TRAPPING INSECTS

[76] Inventor: Roger L. Kitterman, 16610 Placita Ninos #2, Marana, Ariz. 85653

[21] Appl. No.: 145,415

[22] Filed: Oct. 29, 1993

[51] Int. Cl.$^6$ .................................................. A01M 1/14
[52] U.S. Cl. .................. 43/115; 43/111; 43/113; 43/114; 43/116
[58] Field of Search .................... 43/114, 115, 116, 43/111, 136, 113

[56] References Cited

U.S. PATENT DOCUMENTS

| | | | |
|---|---|---|---|
| 485,815 | 11/1892 | Koechen | 43/114 |
| 783,255 | 2/1905 | Foote | 43/116 |
| 1,148,748 | 8/1915 | Brewer | 43/113 |
| 1,477,081 | 12/1923 | Salinas | 43/114 |
| 1,622,591 | 3/1927 | Killion | 43/115 |
| 2,249,718 | 7/1941 | Travnicek | 43/116 |
| 4,074,457 | 2/1978 | Sato | 43/113 |
| 4,127,961 | 12/1978 | Phillips | 43/113 |
| 5,369,908 | 12/1994 | Morales | 43/111 |

FOREIGN PATENT DOCUMENTS

| | | | |
|---|---|---|---|
| 0374926 | 9/1939 | Italy | 43/114 |
| 0050115 | 10/1918 | Sweden | 43/116 |
| 9220224 | 11/1992 | WIPO | 43/114 |

*Primary Examiner*—Kurt Rowan
*Attorney, Agent, or Firm*—Gregory J. Nelson

[57] ABSTRACT

An apparatus and method of attracting and trapping insects which includes an elongate strip of trapping material having a sticky substance thereon. In one embodiment, the trapping material is provided as two adjacent plies which are unwound from a feed roll across feed rollers to a take-up roller. A trapping area is provided between the feed rollers. The supply and feed rollers and take-up rollers may be contained in a cartridge which is disposable. The cartridge can be inserted in a housing having auxiliary components such as electrical components and lighting. In alternate embodiments, the trapping material may be a filament-like material or may be tubular material which is provided in flattened form and expanded to tubular shape in the trapping area and thereafter rewound on the take-up roll. The drive motor may be provided for automatically and intermittently advancing the take-up roller such that new sections of trapping material are automatically advanced into the trapping section, thereby maintaining fresh attractant substance exposed to insects.

14 Claims, 4 Drawing Sheets

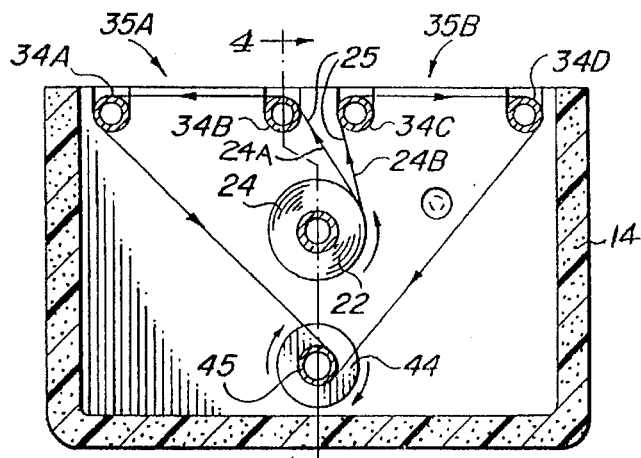
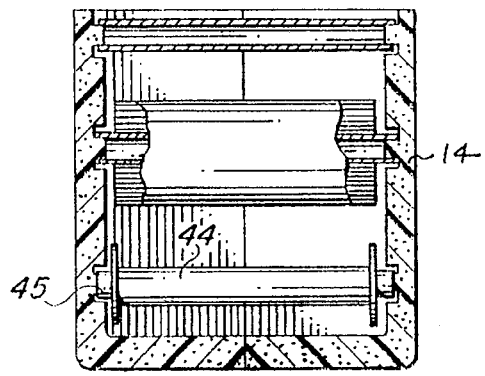
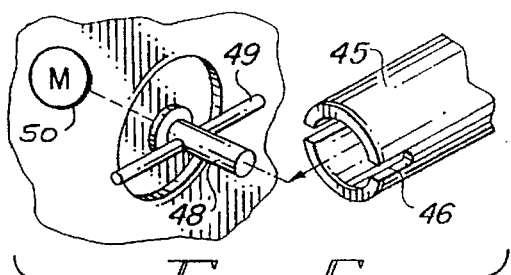
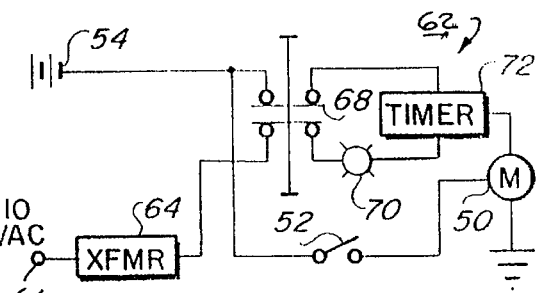
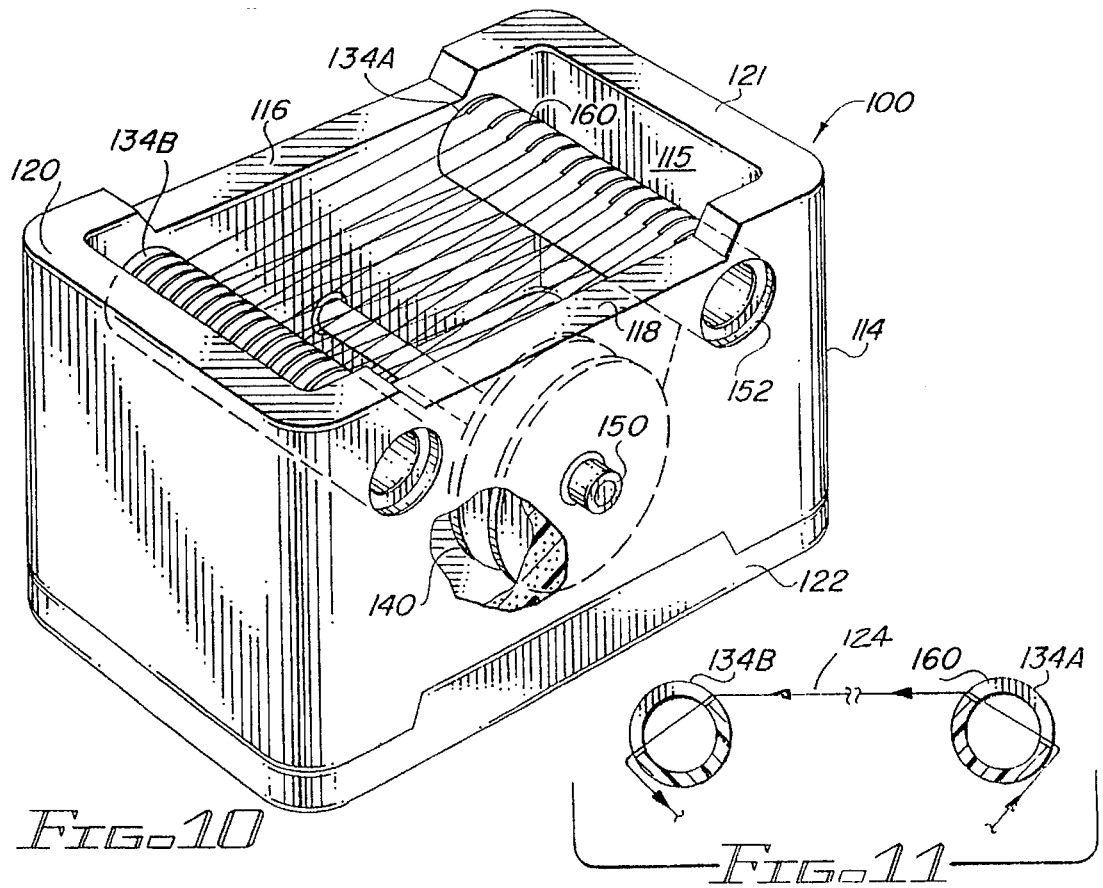

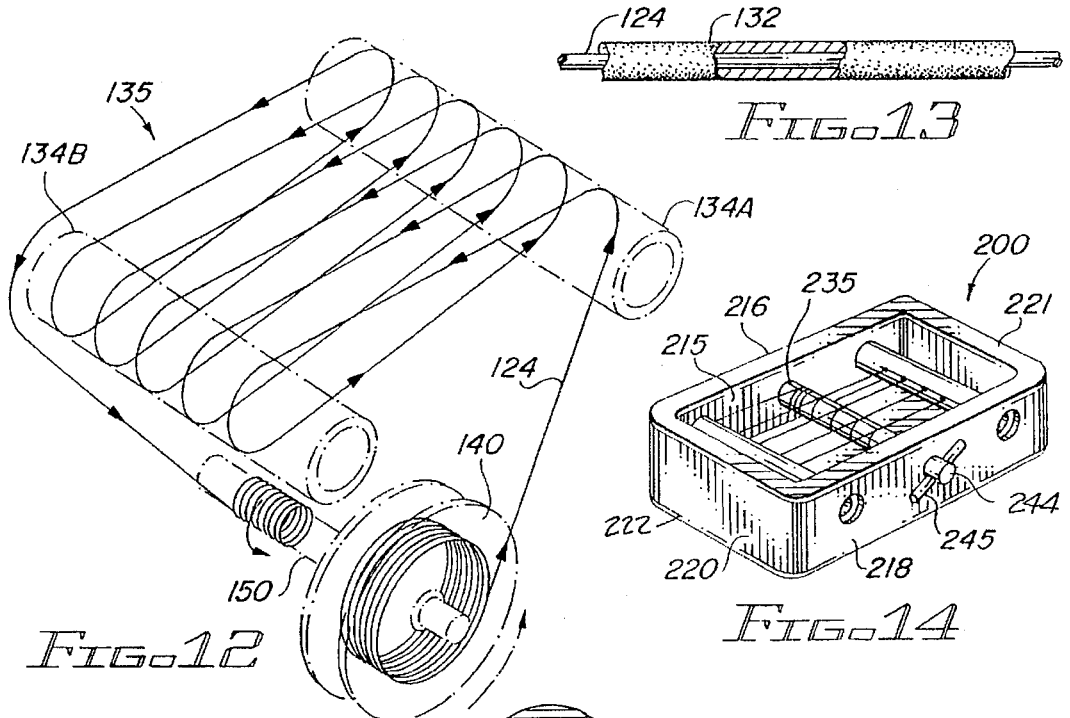
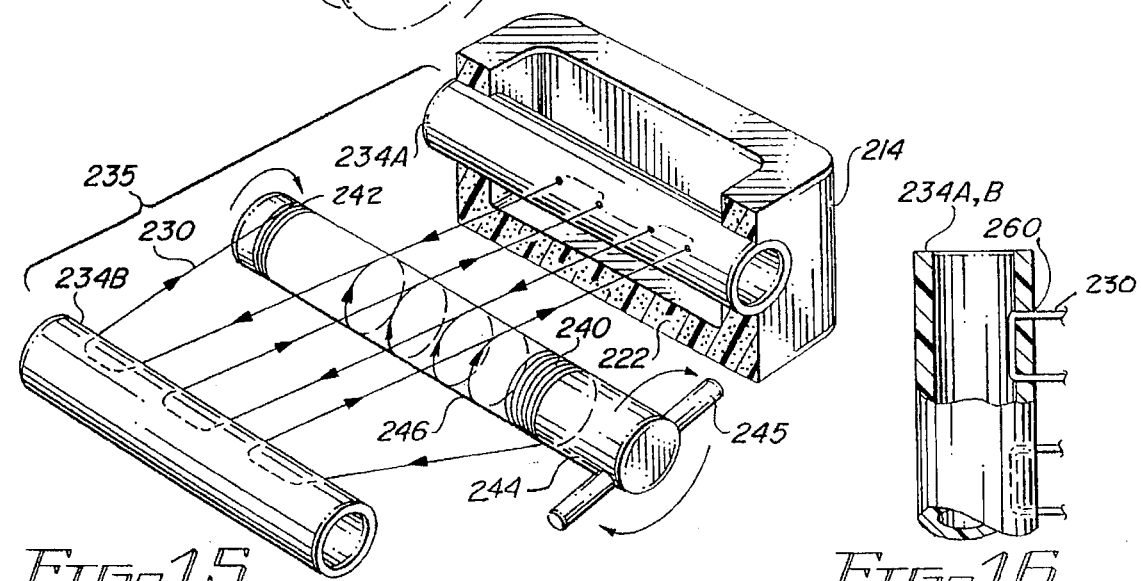
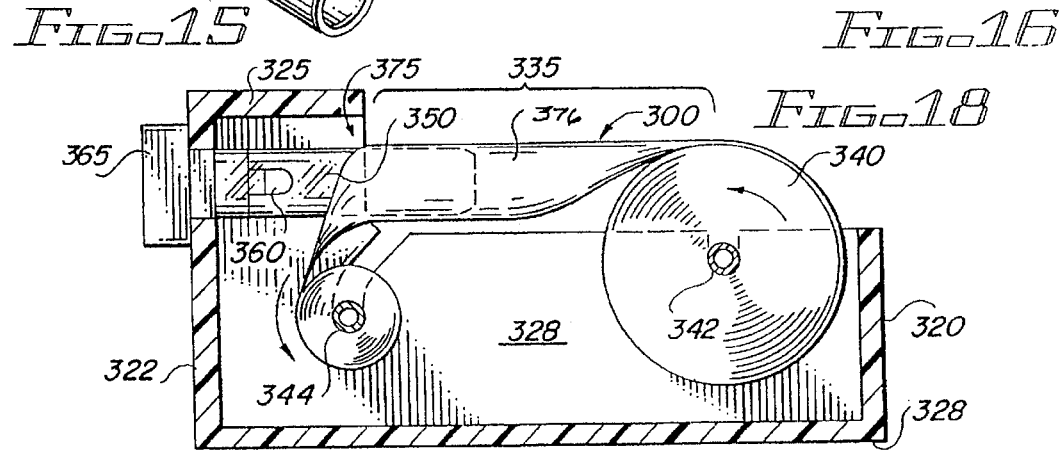

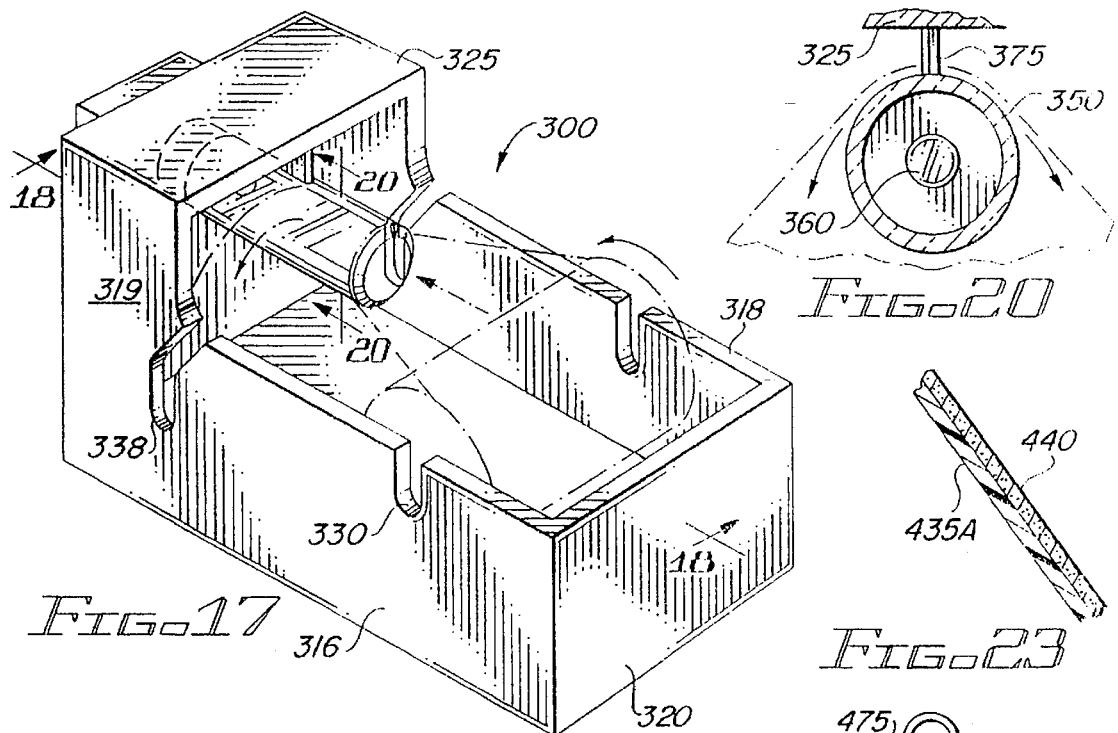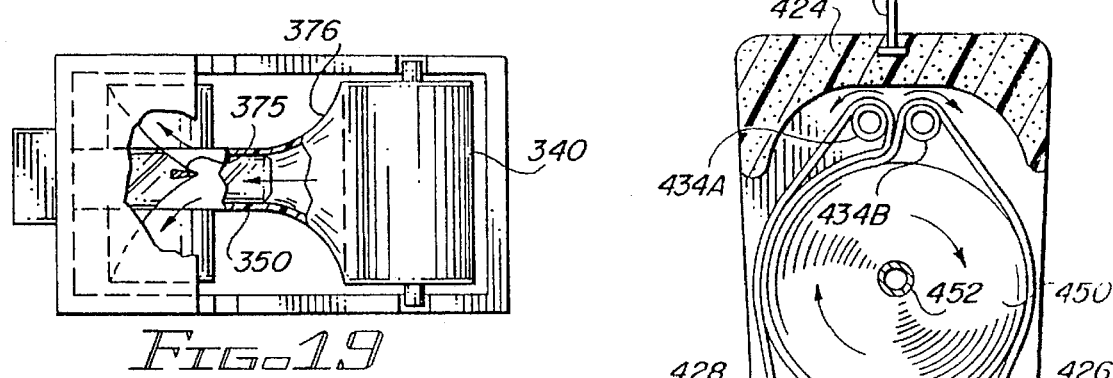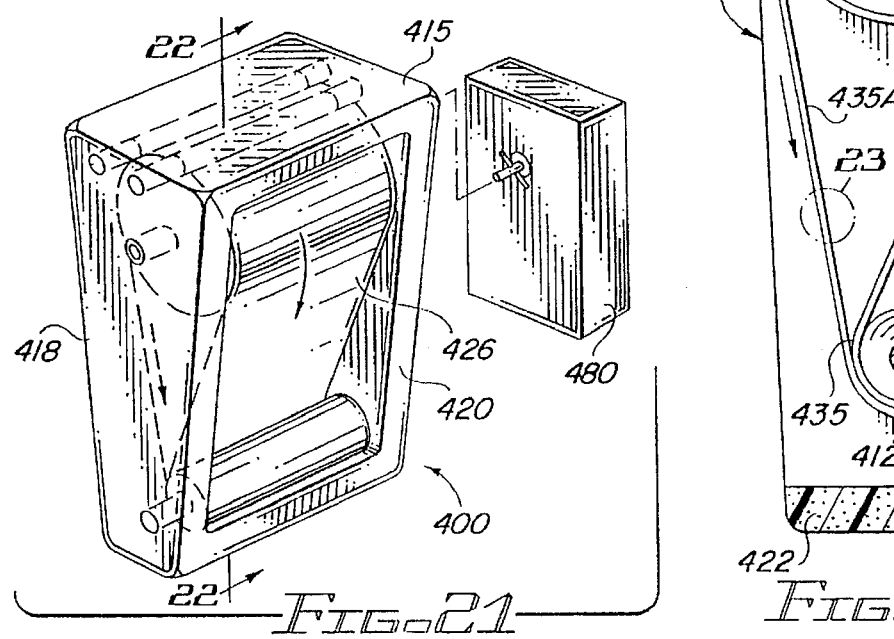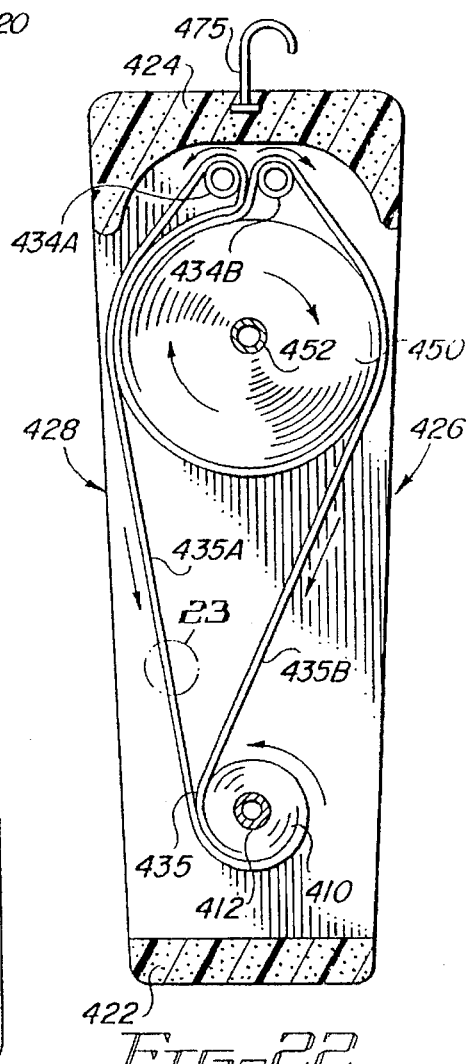

APPARATUS AND METHOD FOR ATTRACTING AND TRAPPING INSECTS

BACKGROUND OF THE INVENTION

The present invention relates to an apparatus and method for attracting and trapping insects and more particularly to such an apparatus and method utilizing an elongated strip of flexible trapping material having a sticky substance applied to a surface of the material. A drive is periodically actuated to advance the trapping material to expose previously unexposed sections of the trapping material in a trapping area or zone. Various attractant mechanisms such as food lures, pheromones, light, color and sound that appeal to one of the senses of the insect may be used in conjunction with the traps.

DESCRIPTION OF THE PRIOR ART

Insects of various types have long presented problems. Insects in homes and commercial establishments may simply be a nuisance or may present health problems. The health problem is more acute in locations such as stables, barns, and hospitals. In addition, insects also present substantial problems to the agricultural industry. Insects such as bollworms, moths and army worms can be devastating to agricultural crops. More recently, parts of the Western United States have been subject to infestation by the white fly.

To address the problems of insects, various solutions can be found in the prior art. For example, devices such as shown in U.S. Pat. Nos. 4,117,624 to Phillips; 825,660 to Klousnitzer; and 2,249,718 to Travnicek, suggest the use of a sticky substance to catch and trap flies on the surface of a flypaper-like material.

Other trapping devices can be found in U.S. Pat. No. 3,968,590 issued to the present Applicant, which device shows a panel coated with an appropriate trap substance which entangles insects. The panel can be removed from the trap and is disposable.

U.S. Pat. No. 2,879,620 to McGinnis shows a vacuum operated device which may be mounted adjacent to lighting fixtures which draws in and collects insects attracted to the light.

An insect exterminator is shown in Pohlman, U.S. Pat. No. 2,778,150. In this patent an insect-attracting device such as electric light is positioned above the mouth of a conduit which leads to a suction fan. Mounted coaxially with the fan is an insect chopper.

A motorized bug catching device is disclosed in U.S. Pat. No. 3,001,321 to Mauro et al which also utilizes a blower arranged to suck the attracted insects into a conduct and into an air-pervious container into which the insects are drawn.

Thus, the above patents are representative of various traps which either utilize a sticky substance or which attract insects or draw them by means of fan or blower into the device.

Devices which utilize sticky substances may be rendered ineffective by dust or other material. To prevent this, unexposed trapping material must periodically be presented to the insects to efficiently trap the insects. Devices which suck insects into a conduit are of limited effectiveness and also are unduly complex or unwieldy.

Accordingly, the present invention provides an insect trapping device which is effective, simple and which automatically replaces unexposed fresh trapping material for previously exposed trapping material. With the insect catching device of the present invention, the trapping material remains sealed to prevent evaporation and deterioration of the attractant or sticky substance until the material is dispensed. Also, the present device transfers the trapped insects to a take-up roll for disposal. This results in a more acceptable, convenient and sanitary device.

Therefore, it is an object of the present invention to provide an improved apparatus and method for attracting and trapping insects.

Another object of the present invention is to provide an apparatus for attracting and trapping insects which device has an elongated strip of trapping material having a sticky substance and cooperating with an attractant substance or device.

Another object of the present invention is to provide an improved apparatus for attracting and trapping insects which may be automatically and periodically advanced so that unexposed sections of the trapping material will be advanced into a trapping area and previously exposed sections of the trapping material are taken up on a roller for subsequent disposal.

Another object of the present invention is to provide an apparatus and method for attracting and trapping insects including an attractant means such as pheromones, food attractants, light, color or sound which lures the insects to the trap.

Another object of the present invention is to provide a method for attracting and trapping insects including the steps of providing a trapping material with an attractant substance and a sticky substance and providing the trapping material on a dispensing apparatus having a motor for automatically dispensing fresh trapping material.

Finally, it is a broad object of the present invention to provide an apparatus and method for attracting and trapping insects which provides a safe, efficient, non-toxic and environmentally acceptable means for reducing the number of flying insects in a controlled area.

SUMMARY OF THE INVENTION

The present invention provides a trap apparatus for attracting and trapping insects including an elongated strip of trapping material having a sticky substance on a surface thereof. A dispensing device is provided for supporting and dispensing the strip of trapping material. The trapping material is fed from a supply roller to a spaced-apart take-up roller which collects the used trapping material. The trapping material is supported by the dispensing device so that attractant material is exposed along its path in a trapping area or zone in which the insects land and become attached to the trapping material.

A drive device advances the take-up device such that exposed lengths of the trapping material are drawn into the take-up device and replaced by previously unexposed sections of trapping material thereby maintaining fresh material in the exposed area of the trap. The trapping material may be a flexible material such as a plastic film or paper and may be in planar sheet form, tubular form or in the form of a line such as a monofilament line, cord or string. Attractant devices may include food lures or pheromones applied directly to the trapping material. Auxiliary attracting devices such as lights, heaters, colors and audible signals of predetermined frequency may also be used.

In a preferred embodiment, the trapping material is provided in a disposable cartridge which may be conveniently removed for sanitary disposal and replaced with a fresh cartridge. The device may be periodically advanced either by an electric motor operated from a dc source such as a battery or solar power array, an electric motor operated from an ac source or may be advanced by manual operation. The advancing of the trapping material substantially lessens the potential for disease to be passed from the insects to the user and increases the acceptability of the device particularly for residential use and use in restaurants and other public locations. The trapping material is supported in a disposable cartridge which will provide long-lasting trapping capability and when expended can be quickly and sanitarily disposed without the user having to contact the trapped insects.

The above and other objects and advantages of the present invention will become more apparent from the following description, claims and drawings in which:

FIG. 3 is a sectional view taken along line 3—3 of FIG. 2;

FIG. 4 is a sectional view taken along line 4—4 of FIG. 3;

FIG. 5 is a partial detail perspective view of the connection between the drive shaft and take-up roller of the device shown in FIG. 1;

FIG. 6 is a partial detail perspective view of the roller and the roller support portion of the cartridge as indicated in FIG. 2;

FIG. 7 is a view of one side of the housing showing the mounting holes;

FIG. 9 is a block diagram of the automatic advance circuit;

FIG. 10 is a perspective view of an alternate embodiment of the insect trapping device of the present invention;

FIG. 11 is a view partly in section showing the insect trapping line extending between two rollers establishing a trapping area;

FIG. 12 is a perspective view with the components in dotted lines illustrating the path of the trapping material from the supply roller to the take-up roller;

FIG. 13 is an enlarged view, partly in section, showing a portion of the coated trapping line;

FIG. 14 is a perspective view of a third embodiment of the present invention utilizing a line as take-up material;

FIG. 15 is a diagrammatic view partly in section showing the path of travel of the trapping material of the embodiment of FIG. 14;

FIG. 16 is a detail view partly in section of one of the feed tubes;

FIG. 17 is a perspective view of yet another embodiment of the insect trap of the present invention;

FIG. 18 is a sectional view taken along line 18—18 of FIG. 17;

FIG. 19 is a top view of the embodiment of the trap shown in FIG. 17;

FIG. 20 is a sectional view taken along line 20—20 of FIG. 17;

FIG. 21 is a perspective view of still another embodiment of the insect trap of the present invention;

FIG. 22 is a sectional view taken along line 22—22 of FIG. 21; and

FIG. 23 is a detail view of a section of the trapping material as indicated in FIG. 22.

Figure 1:
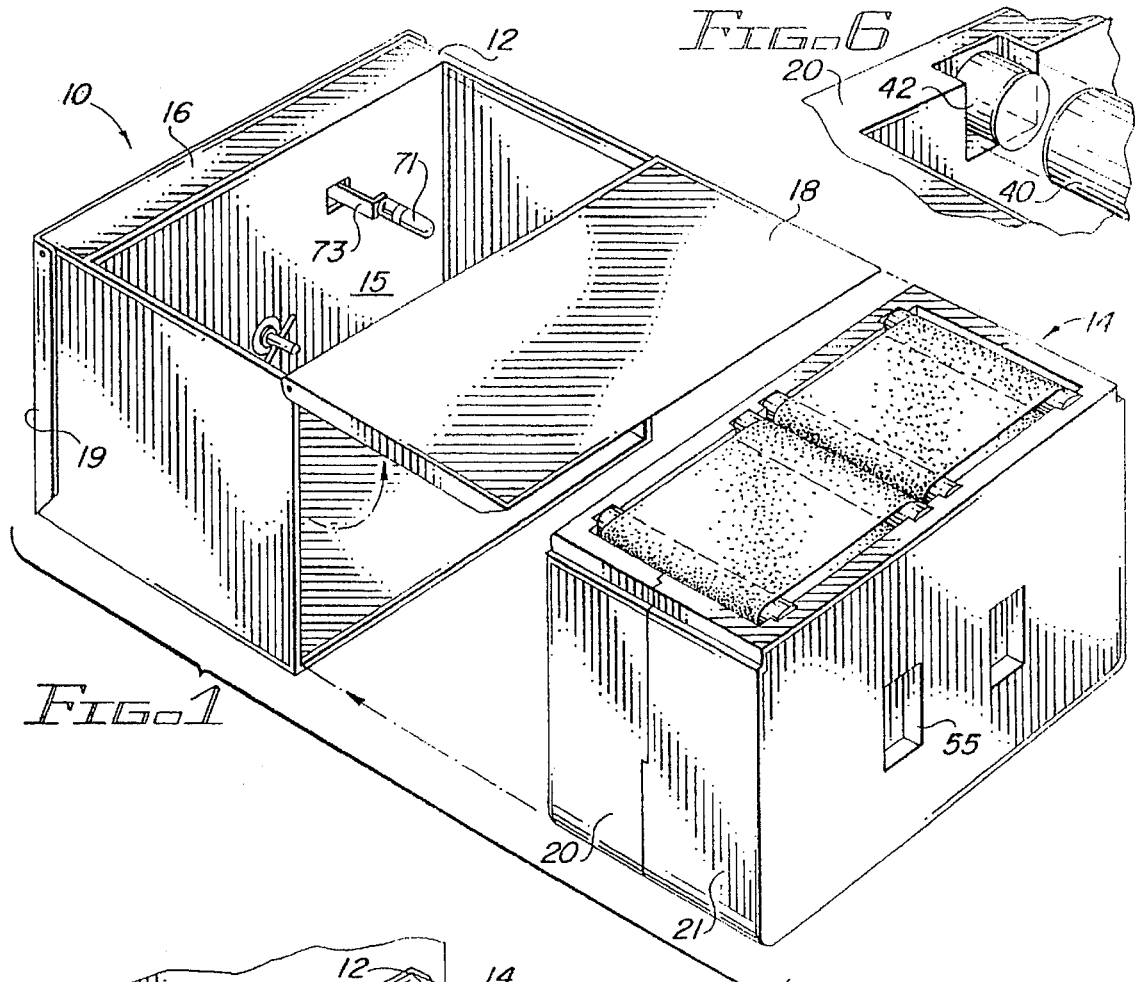
FIG. 1 is a perspective view of a preferred embodiment of the insect trapping device of the present invention showing the outer container and removable cartridge.

Turning now to the drawings, a preferred embodiment of the insect trapping apparatus ("trap") of the present invention is shown in FIGS. 1 to 9 and is generally designated by the numeral 10.

The trap 10 includes an outer container 12 which receives a cartridge 14. The outer container defines an internal compartment 15 access to which is provided by upwardly pivoting cover 18. A battery compartment 16 located opposite cover 18 receives the drive motor and other circuitry components as will be explained hereafter. A cover 19 is provided for access to the battery compartment.

The cartridge 14 is inserted into the compartment 15 when in use. The cartridge, once the trapping material is expended, may be removed and replaced with a fresh cartridge.

The cartridge 14 has a generally box-like construction having sections 20 and 21 which may be formed from a suitable material such as styrofoam, polyethylene or other such inexpensive, nontoxic disposable materials. The halves are joined to one another to form the cartridge body.

Figure 2:
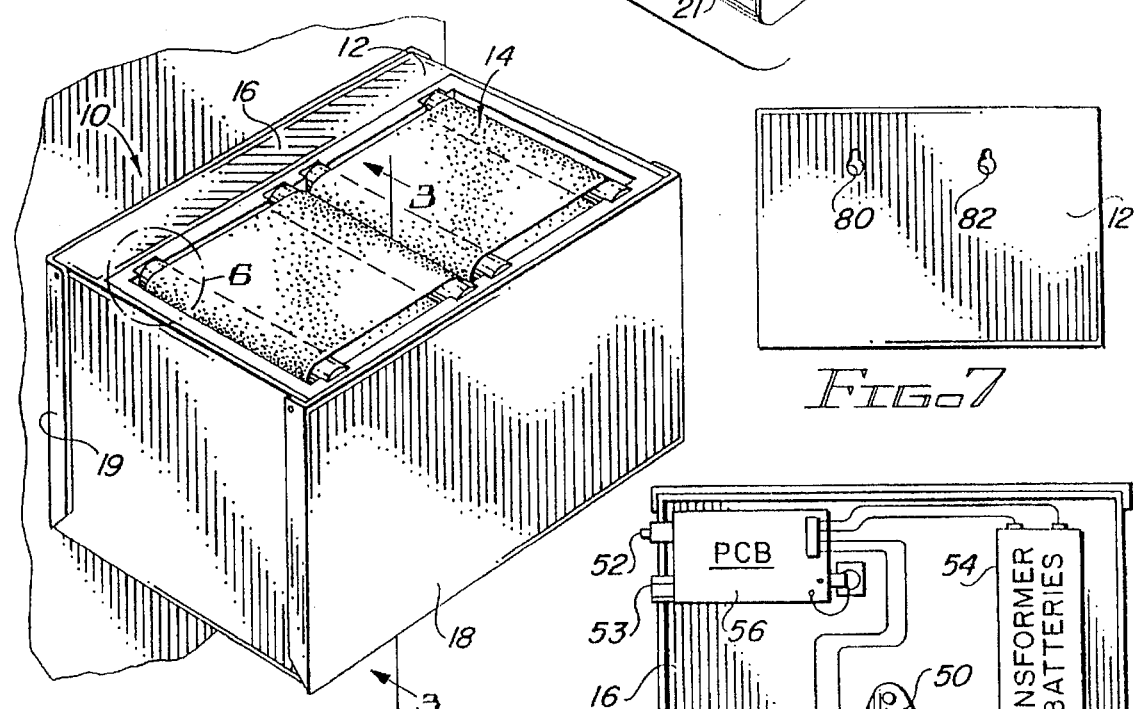
FIG. 2 is a perspective view similar to FIG. 1 showing the dispenser in a mounted, operative position.
Figure 8:
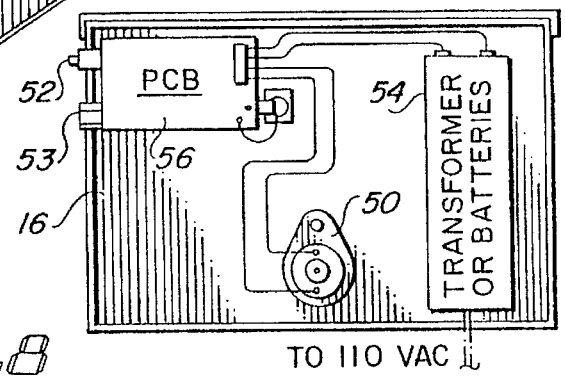
FIG. 8 is an elevational view of the container with the cover removed illustrating the electrical circuitry.

FIGS. 2 and 3 show the cartridge. Dispensing or supply roll 22 contains a roll of trapping material 24 which consists of separate plies 24A and 24B. A sticky substance 25 is applied at the interface between the plies 24A and 24B. The sticky substance may be any suitable sticky or tacky substance which will trap insects such as petroleum-based jellies, butadene or products such as those commercially sold under the name Seabright. An attractant may also be applied to a surface of the trapping material. The attracting substance is one that will be easily applied and may be a food scent, pheromone such as those commercially available from Agrisense, or various odiferous attractants such as one sold under the trademark "Gotcha".

As seen in FIG. 3, the trapping material is separated into separate plies as it is unwound and passes over the support rollers 34A, 34B, 34C and 34D. Support rollers 34A and 34B support ply 24A of trapping material with this ply supported having a generally horizontal trapping area or zone 35A between the spaced-apart rollers. Ply 24B is similarly supported on rollers 34C and 34D with a generally horizontal trapping area or zone 35B extending between the rollers 34C and 34B. The rollers, as best seen in FIG. 6, are each in the form of a tube 40 which is preferably rotatably supported at a stub shaft 42 integrally molded into the side walls of the container halves 20 and 21. The projection 42 is received within the hollow interior of the tube 40 of the rollers.

After the plies of trapping material pass over the support rollers, the plies of the material are drawn onto a take-up roller 44. The take-up roller 44 is preferably rotatably mounted below the dispensing roll and the ends of the take-up roller are rotatably supported on shaft 45 at the opposite side walls of the container. In this manner, as the take-up roller 44 is rotated, the plies or sections of the trapping material is drawn from the dispensing roll over the supporting rollers 34A to 34C onto the take-up roller. The right end of the take-up shaft 45 is slotted at 46 as shown in FIG. 5. This end of the shaft extends outwardly of the side wall of the container to be engaged over a T-shaped drive shaft 48 of drive motor 50 with the slot 46 fitting over and engaged by transverse rod 49. With the drive shaft 48 engaged, the trapping material is drawn from the dispensing roll across the feed rollers and exposing unexposed sections of the trapping material at trapping areas 35A and 35B.

Motor 50, motor engagement switch 52, adapter socket 53, battery compartment 54 and PCB control board 56 are located in compartment 16. The motor engagement switch 52 and the ac adapter socket 53 are preferably accessible through the wall of the container. The drive motor 50 is of a standard electric motor type having a gear box designed to provide the desired torque and speed. at output shaft 48. Battery compartment 54 receives standard battery cells or a battery pack.

FIG. 9 is a block diagram of the drive motor circuit 62. Power for the circuit is supplied either by batteries 54 or by transformer 64, the transformer being connected to a 110 volt ac outlet 66 through ac adapter socket 53. The power source, being either batteries or transformer, supplies power through the power switch 68. The power switch operates in the following manner: Power from batteries 54 is passed through timer 72 as long as no power is being supplied by the transformer 64 to the power switch 68. Power switch 68 flips to complete the circuit between the transformer 64, lamp 70 and timer 72 and disconnects batteries 54 from the circuit so that no power flows from battery 60 when transformer 60 is emitting power. The lamp 70 includes a bulb 71 mounted on bracket 73 extending into the container 12 as seen in FIG. 1. It is preferred that the light bulb be positioned below one of the trapping areas when the cartridge is positioned within the container 12. Lamp 70 provides an additional attracting source as insects generally are attracted to lights.

Lamp 70 is on only when the transformer is in operation to limit drain of the batteries 54. Power then flows to the timer 72 which is a commercially available unit such as a standard TLC 556 CN micro circuit timer as manufactured by Texas Instruments. As long as the motor engagement switch 52 is not actuated, power will flow through switch 68 and thus the timer 72. However, when the motor engagement switch 52 is actuated, power bypasses the switch 68 and timer 72 and is supplied directly to the motor 50. In this manner, the motor may be selectively operated by the motor engagement switch 52. Otherwise the motor 50 will be periodically energized in response to power passing through the timer 62. Of course, it is to be understood that many variations of this circuit may be utilized including alternate timer micro circuits and other power sources. It is important that any timing circuit be capable of automatically and periodically energizing the drive motor and thereby rotating the take-up rollers and advancing the insect trapping material intermittently. It is possible, of course, that the electric drive motor arrangement described above could be omitted and the take-up roller advanced periodically manually by the user by the user rotating the end of shaft 45 with a key or other implement at slot 46.

Cartridge 14 is disposable to minimize user contact with trapped insects. After the trapping material has been entirely exposed and would on the take-up roller, the cartridge may be removed by grasping at finger slots 55 and a new cartridge inserted. The device may be placed in any suitable location and may be simply placed on a horizontal supporting surface. Alternatively, the container 12 may be suspended from hooks or fasteners provided for this purpose. To this end, as seen in FIGS. 2 and 7, one wall of the container 12 is provided with spaced-apart keyhole slots 80 and 82 which can be engaged over fasteners projecting from a vertical surface such as a wall.

The embodiment of the invention described with respect to FIGS. 1 to 9 utilize an elongated strip of planar or sheet-like trapping material having two plies arranged in face-to-face relationship with a trapping material and an optional attractant applied at the interface of the plies. Referring to FIGS. 10–13, an alternate embodiment of the present invention is shown which is generally designated by the numeral 100 and which utilizes a cord or line as the trapping material. Embodiment 100 includes a cartridge 114 which has opposite side walls 116 and 118 and end walls 120 and 121 which, along with bottom 122 define an internal compartment 115. The cartridge may be formed from any suitable material and preferably is molded from an inexpensive material such as polyethylene or polyurethane. The cartridge may be used as a separate free-standing device or may be used in conjunction with an exterior container having a motorized drive such as container 12 described with respect to FIGS. 1 to 9. The trapping material 124 is provided on a feed roll or spool 140 and material may be a monofilament synthetic material such as that material commonly used for fishing line or may be a cord or line of textile or fiber material. The material is preferably provided with a coating of tacky or sticky material 132. The material can also be drawn through a bath of the sticky material as it leaves the spool 140. The feed spool 140 is rotatably mounted on one end of shaft 150 which extends transversely between the opposite side walls 116 and 118 of the cartridge. One end of the take-up shaft 150 projects outwardly beyond side wall 118 as shown and may be manually turned by the user or may be engaged by a motorized drive unit provided as part of an exterior container such as container 12.

As best seen in FIG. 12, the line 124 passes from the feed spool 140 upwardly and partially around rollers 134A and 134B returning to shaft 150 to which the free end of the line has been attached. The rollers 134A and 134B are preferably stationary tubular members which may be plastic members such as PVC tubing inserted in axially aligned bores 152 in the opposite side walls 116 and 118 at a location disposed just below the upper edge of the housing. Each of the rollers 134A and 134B are provided with a plurality of parallel spaced-apart guide slots 160. Thus, the line 124 extends continuously back and forth between the rollers 134A and 134B guided in the slots 160. The path of the material is best shown in FIG. 12. Thus, a generally horizontal trapping zone or area 135 is provided at the upper edge of the cartridge between the rollers 134A and 134B. As the shaft 150 is periodically rotated either manually or by motor, the line advances to position fresh, unexposed line in the area 135.

FIGS. 14 to 16 show still another embodiment of the insect trap of the present invention which is generally designated by the numeral 200. The insect trap 200 again is in the form of a cartridge 214 which may be used in conjunction with an exterior housing or independently. Cartridge 214 has opposite side walls 216, 218 and opposite end walls 220 and 221. A floor 222 extends across the bottom of the cartridge and with the end and side walls defines an interior compartment 215. A drive shaft 244 extends transversely between the side walls 216 and is rotatably mounted in aligned bores 235. One end of shaft 244 projects beyond side wall 218 and has a tee handle 245 which may be manually engaged or engaged in a coupling portion of the drive shaft of an electric motor provided as part of a container such as container 12 described above. Thus, the drive shaft may be periodically rotated to advance the trapping material 230 which is shown again as a line. A supply of the line 230 is provided and wound about shaft 244 at spool location 240. The material passes from location 240 continuously through a plurality of apertures or bores 260 provided at spaced-apart locations in the tubular roller members 234A and 234B. The free end of the material is secured to shaft 244 at a location 242 spaced apart from the supply spool area 240. The line 230 is also wound about the drive shaft in a single turn as it passes from one spool to the other as represented by turn 246. With this arrangement, rotating shaft 244 in one direction or the other will advance the material through the trapping area 235 generally defined by the parallel line arrangement and the rollers 234A and 234B. The line is coated with a suitable tacky material and optionally with an attractant. The insects become trapped on the line and as the line is advanced in one direction or the other, the insects are shaved or peeled from the filament as the filament enters the apertures 260 associated with the tubes or rollers 234B and 234A. The advantage of the embodiment as shown in FIGS. 14 to 16 is that the direction of travel of the trapping material may be reversed. For example, if the material is advanced in one direction until it has been unwound from area 240 and re-wound at area 242, the material can then be reversed, rewinding the material at location 240. Insects are collected in the bottom of the cartridge and when the effectiveness of the trapping material has been exhausted, the cartridge may be disposed of in a convenient and safe manner.

Still another embodiment of the present invention is illustrated in FIGS. 17 to 20. In this embodiment, generally designated by the numeral 300, a housing is provided having opposite side wall 316 and 318 and end walls 320 and 322. The rear of side walls 316 and 318 each have an elevated section 319 which is enclosed by a top 325. A floor 328 extends across the bottom of the housing. The housing defines an internal compartment 328. The side walls 316 and 318 are grooved at 330 to receive a supply roll 340 of trapping material. The supply roll 340 has stub shafts 342 which are rotatively engageable within the U-shaped grooves 330. The feed roll 340 has a supply of trapping material 376 which is a flexible material which may be paper but is preferably a synthetic material such as plastic film formed in the shape of a tube and flattened and wound on shaft 342 forming supply roll 340. The exterior surface of the trapping material is coated with a suitable tacky or sticky substance as described above and may include an attractant as well.

Slots 338 are provided in the side walls 316, 338 rearwardly displaced from slots 330. Slots 338 are for receipt of the ends of take-up shaft 344 to rotatively support the take-up shaft. A spreader tube 350 extends forwardly from the rear wall 322 of the housing and is generally perpendicular to the feed roll 340. The spreader tube 350 is positioned above the take-up roll and extends to a location intermediate the take-up end feed rolls. The tubular spreader member may be transparent or translucent so that a light source 360 may be positioned within the tube and connected to a suitable power source 365. The light within the tube will pass through the tube and illuminate the trapping area 335. The take-up shaft 344 may be connected to a suitable drive unit which can be contained in a separate module secured to the housing at one side wall 316 or 318. The drive unit may be battery powered or powered from a suitable ac source similar to the drive unit described with respect to FIG. 8 or may be a solar powered unit. The trapping material extends over the distal end of the spreader tube 350 as best seen in FIG. 18. The tube causes the material to expand from its flattened condition to a generally tubular shape in the trapping area 335. A knife blade 375 is positioned above the spreader tube 350 at a location disposed above the take-up shaft 344. At this point, the tubular trapping material is longitudinally split so that it may pass downwardly to be wound on the take-up shaft 344.

It may be desirable to provide the trapping material in a color which is selected to attract a particular type of insect. For example, it is known that insects such as white flies are generally attracted to the color yellow and a vinyl material tinted or colored yellow would be particularly suitable for trapping this type of insect. As the trapping material 376 is unwound from the feed roll 340, it is expanded to its tubular shape in the trapping area 335. The tubular exterior or exposed surface of the trapping material is coated with a tacky substance and as insects approach and contact the material, they are trapped. The drive shaft 344 is either continuously or intermittently actuated so that new and fresh trapping material is presented in the trapping area 335. Attractants may also be placed within the housing located on the floor 328 below the area 335. When the supply roll 340 is exhausted, the take-up shaft is removed and a new roll 340 loaded in the trap.

Yet another embodiment of the invention is illustrated in FIGS. 21 to 23. In this embodiment, generally designated by the numeral 400, the trapping material 435 is a two-ply material provided on a feed roll or spool 410 rotatively supported on shaft 412 in the cartridge 415. The material as it is unwound is separated into plies 435A and 435B. The exterior surface of the plies are provided with a suitable tacky substance 440 which may optionally include an attractant. The cartridge 415 includes opposite side walls 418 and 420, bottom 422 and top 424. The front and rear of the cartridge are generally open at 426 and 428 to define opposed trapping areas. The take-up roll 450 is rotatively supported between the opposite side walls 418 and 420 on shaft 452 at a location disposed above the supply or feed roll. Trapping material is dispensed from the feed roll 410 to the take-up roll 450 and the plies pass over feed rollers 434A and 434B. The plies are separated as they leave the feed roll and thereafter pass through the trapping areas at the opposite sides of the trap. The material then passes over the feed rollers 434A and 435B to be rewound on the take-up roller.

It is preferred that this embodiment, as well as the previous embodiments, be provided with a leader section of trapping substance which is free of tacky substance to facilitate cleaner, more sanitary handling of the devices prior to the time they are put into use.

The device of FIGS. 21 to 22 may be placed in either horizontal or vertical position on a supporting surface or may be suspended in a vertical position from hook 475 provided for this purpose. A drive module 480 may be attached to provide intermittent advancement of the trapping material.

The figures and various embodiments described above also clearly illustrate the method contemplated by the present invention. The method includes the steps of providing an elongated strip of trapping material, including a sticky substance. The trapping material may also include an attractant wherein the attractant is intended to attract insects and the sticky substance is adapted to trap and secure the insects contacting the sticky substance. Trapping material is preferably provided in roll form and pre-coated with sticky substance and an attractant is also provided. A suitable dispensing device such as a housing, box or cartridge supports and dispenses the trapping material. The trapping material passes from the supply which is normally the roll to a take-up device which is a roller or shaft. The take-up device may be rotated either manually or by an electric ac or dc motor such that unexposed sections of the trapping material are periodically exposed and previously exposed sections are periodically advanced and drawn onto the take-up means. The separated section of trapping material is thus supported and exposed in an insect trapping position in a trapping area such that insects may be attracted thereto and trapped thereon. The trapping material is then taken up on the take-up device by periodically either manually or automatically advancing the take-up device as pointed out above.

The method may be used with multiple ply trapping material which are separated into sheets to expose the attractant. The method also encompasses an attractant material provided in line or tubular form.

The method also comprehends the use of various attractants such as food substances, pheromones, and the like. Lights may also be used in assisting to attract insects as well as color. Color may be provided by tinting or coloring the trapping material in a color known to attract the particular type of insects.

Sound of predetermined frequency may also be used to attract insects and repel birds and other creatures. A sound emission device may be associated with the trap for these purposes. For example, it is known that sounds in the frequency range of approximately 500 cycles will serve to attract mosquitos. The trapping apparatus of the present invention may be provided as a disposable cartridge to be used in conjunction with an outer container which houses some of the components such as the electrical components and drive motor. Conveniently, the cartridge may be removed and conveniently disposed of and replaced with a new cartridge. The device can be used for residential use, commercial use or agricultural use. The effectiveness of the device has been proven in agricultural applications and a single trap may provide insect control for as many as from one to five acres of agricultural crops.

While the principles of the invention have been made clear in the illustrative embodiments set forth above, it will be obvious to those skilled in the art to make various modifications to the structure, arrangement, proportion, elements, materials and components used in the practice of the invention. To the extent that these various modifications do not depart from the spirit and scope of the appended claims, they are intended to be encompassed therein.

I claim:

1. An apparatus for attracting and trapping insects comprising:
   (a) a housing;
   (b) a trapping material in the form of a continuous, elongate line having a coating of a sticky substance thereon;
   (c) dispensing means in said housing for supporting and dispensing said trapping material;
   (d) spaced-apart support means for supporting said trapping material in an insect trapping position having an exposed trapping area exposed to allow insects to land and be trapped thereon; and
   (e) take-up means for drawing said trapping material from said dispensing means through said trapping area.

2. The apparatus of claim 1 further including drive means for advancing said take-up means such that previously unexposed lengths of trapping material are automatically, periodically exposed in said trapping area and previously exposed sections of said trapping material are automatically, periodically drawn onto said take-up means thereby maintaining fresh sticky substance in said trapping area.

3. The apparatus of claim 2 wherein said drive means comprises a drive motor and a timing circuit, said drive motor detachably connectable to said take-up means for rotation of said take-up means about a rotational axis, said timing circuit operative to automatically periodically actuate said drive motor to actuate said take-up means and draw trapping material from said dispensing means.

4. The apparatus of claim 2 further comprising an outer container and wherein said housing is replaceably receivable in said container.

5. The apparatus of claim 4 wherein said container comprises a generally rectangular box having a lid for removably securing said housing within said container, said container further including a motor engagement switch for manually engaging said drive motor thus advancing said trapping material.

6. The apparatus of claim 5 further comprising an attractant light mounted to attract insects to said apparatus.

7. The apparatus of claim 1 wherein said trapping material is treated with an insect attracting substance.

8. The apparatus of claim 1 wherein said line-like material is a filament.

9. The apparatus of claim 1 wherein said trapping material is colored.

10. The apparatus of claim 1 further including insect attracting means comprising audio means emitting a signal of a predetermined frequency.

11. An apparatus for attracting and trapping insects comprising:
   (a) a housing;
   (b) a trapping material comprising a line extending in parallel arrangement across a trapping area having a sticky substance applied thereto;
   (c) dispensing means for supporting and dispensing said trapping material;
   (d) said sticky substance on said trapping material being substantially unexposed upon support of said trapping material by said dispensing means in a trapping area, said sticky substance on said trapping material being exposed upon withdrawal of said trapping material from said dispensing means;
   (e) take-up means operatively connected to said trapping material for collecting and withdrawing said trapping material from said dispensing means such that trapping material in said trapping area is advanced through said trapping area; and
   (f) drive means operatively connected to said take-up means for selectively operating said take-up means.

12. The apparatus of claim 11 wherein said line is supported by tubular support members having apertures therein receiving said line.

13. An apparatus for attracting and trapping insects comprising:
   (a) a flexible trapping material having tubular cross section when expanded having an inner and outer surface and having a sticky substance applied to the outer surface thereof, said trapping material being supplied in a flat rolled condition and being at least partially transparent;
   (b) dispensing means for supporting and dispensing said trapping material;
   (c) spreader means engaging the inner surface of said trapping material in a trapping area having light means associated thereon;
   (d) said trapping material being expanded to said generally tubular cross section by said spreader means to expose said sticky substance on said trapping material upon withdrawal of said trapping material from said dispensing means;
   (e) take-up means operatively connected to said trapping material for collecting and withdrawing said trapping material from said dispensing means such that trapping material in said trapping area is caused to be advanced through said trapping area; and (f) drive means operatively connected to said take-up means for selectively operating said take-up means.

14. An apparatus for attracting and trapping insects comprising:

(a) a flexible trapping material having a generally tubular cross section when expanded having an inner and outer surface and having a sticky substance applied to the outer surface thereof, said trapping material being supplied in a flat rolled condition;

(b) dispensing means for supporting and dispensing said trapping material;

(c) spreader means engaging the inner surface of said trapping material in a trapping area;

(d) said trapping material being expanded to said generally tubular cross section by said spreader means to expose said sticky substance on said trapping material upon withdrawal of said trapping material from said dispensing means;

(e) take-up means operatively connected to said trapping material for collecting and withdrawing said trapping material from said dispensing means such that trapping material in said trapping area is caused to be advanced through said trapping area;

(f) knife means for cutting said trapping material as the trapping material is drawn past said trapping area; and (g) drive means operatively connected to said take-up means for selectively operating said take-up means.

\* \* \* \* \*